(12) United States Patent
Lohkamp

(10) Patent No.: US 6,380,496 B1
(45) Date of Patent: Apr. 30, 2002

(54) APPARATUS FOR WEIGHING WHEELED OR WHEEL-SUPPORTED LOADS

(75) Inventor: Thomas Allen Lohkamp, Joplin, MO (US)

(73) Assignee: Cardinal Scale Manufacturing Company, Webb City, MO (US)

( * ) Notice: Subject to any disclaimer, the term of this patent is extended or adjusted under 35 U.S.C. 154(b) by 43 days.

(21) Appl. No.: 09/648,126

(22) Filed: Aug. 25, 2000

(51) Int. Cl.[7] .................. G01G 19/02; G01G 23/00; G01G 19/00
(52) U.S. Cl. .................. 177/144; 177/146; 177/151; 177/161; 177/199
(58) Field of Search .................. 177/144, 145, 177/146, 126, 151, 161, 199, 244

(56) References Cited

U.S. PATENT DOCUMENTS

| | | | |
|---|---|---|---|
| 3,191,701 A | 6/1965 | Gray | 177/209 |
| 3,530,949 A | 9/1970 | Swersey et al. | 177/209 |
| 3,603,417 A | 9/1971 | Wachholz | 177/126 |
| 3,722,611 A | 3/1973 | Tirkkonen | 177/144 |
| 3,887,022 A | 6/1975 | Stanev | 177/146 |
| 3,961,675 A | 6/1976 | Siegel | 177/126 |
| 4,281,730 A | 8/1981 | Swersey et al. | 177/144 |
| 5,086,856 A | 2/1992 | Haggstrom | 177/161 |
| 5,861,582 A | 1/1999 | Flanagan et al. | 177/144 |

*Primary Examiner*—Randy W. Gibson
(74) *Attorney, Agent, or Firm*—Hovey Williams LLP

(57) ABSTRACT

An apparatus (10) for weighing wheeled or wheel- or caster-supported loads, including non-ambulatory patients confined to wheeled beds, which combines lift, support, and weight-measuring functions. The apparatus (10) is lightweight, portable, and employs a foot-activated lever-based design, including a foot bar (51) and pivoting wheel receptacle (50), for raising both the load and the load's wheeled support, if any. The apparatus (10) can be positioned for use without moving the load, and, because the apparatus utilizes leg and lower body strength, operators need not possess substantial arm or upper body strength. Thus, injuries which result from improper lifting techniques are avoided.

13 Claims, 3 Drawing Sheets

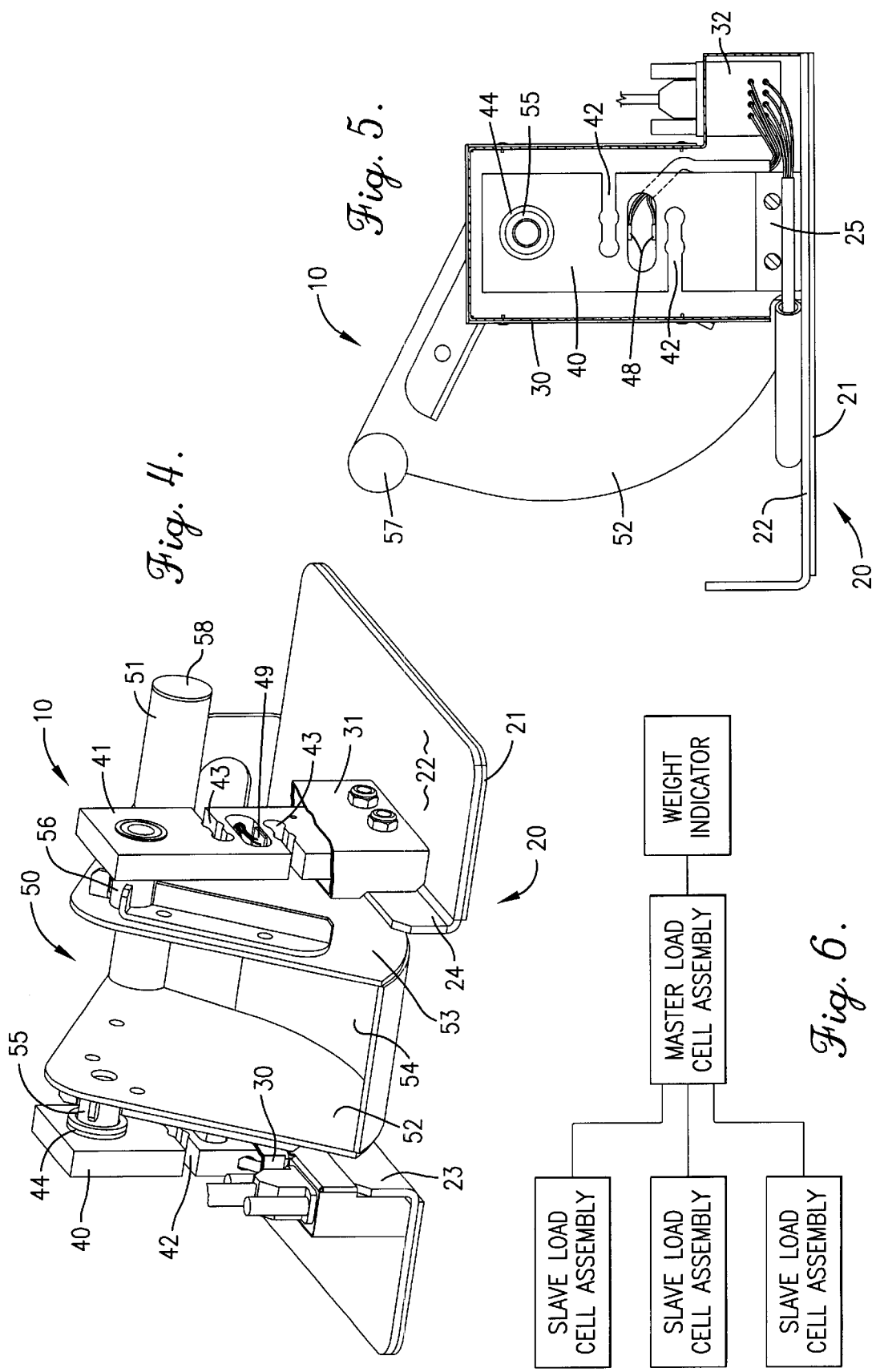

//‌

APPARATUS FOR WEIGHING WHEELED OR WHEEL-SUPPORTED LOADS

BACKGROUND OF THE INVENTION

1. Field of the Invention

The present invention relates to weight-measuring devices, and, more particularly, to apparatuses for measuring the weights of wheeled or wheel-supported loads.

2. Description of the Prior Art

It is often desirable to weigh wheeled or wheel-supported loads, and various devices and methods exist for doing so. Weight-measuring devices exist, for example, which require the operator to push, pull, lift, lever, drive, or roll the load into position. All have their drawbacks-pushing, pulling, and lifting may require substantial strength; rolling, pushing, and pulling can be difficult and dangerous on smooth floors or uneven ground; driving requires a means of propulsion; and lever-based designs typically require substantial upper body strength or cumbersome and unwieldy lever attachments. These devices are also typically voluminous, heavy, clumsy to operate, complex or expensive. Furthermore, where the device is effectively non-portable, either the load must be transported to the weight-measuring device, or a separate device must be purchased and installed for each load.

Some weight-measuring devices are designed with particular types of loads in mind. Specialized devices exist, for example, for weighing non-ambulatory persons without removing them from their wheel-supported beds. These devices are desirable where an illness requires frequent or constant monitoring of a patient's weight and it is impractical or injurious to remove the patient from their bed for each weighing. Patients and beds, particularly specialized beds, can be very heavy. Frequently, the operator attempting to weigh a patient lacks the substantial strength needed to lift or push or pull a patient and their bed into position for weighing. Furthermore, a poor lifting technique can result in injury to the operator. Where the device requires that the bed be rolled, pushed, or pulled into position, smooth or waxed hospital floors may make doing so difficult or dangerous. Lever-based devices typically require substantial upper-body strength, particularly arm strength, which hospital personnel may not possess, or incorporate cumbersome, unwieldy lever attachments that are impractical for use in a confined room or other hospital setting.

SUMMARY OF THE INVENTION

The weight measuring apparatus of the present invention includes novel advancements in weight measuring technology which make the weighing of wheeled or wheel-supported loads easier and more efficient. This apparatus overcomes many of the drawbacks present in the art by employing a foot-activated lever to raise and position the wheeled or wheel-supported load for weighing. This design harnesses the naturally superior strength of the legs and lower body, and does not require that the operator possess substantial arm or upper body strength. The present apparatus is also lightweight and portable, allowing it to be easily moved from one application to another. Furthermore, being easily moved and positioned, the present apparatus does not require that the load be moved across smooth or slippery, possibly waxed, floors.

In use, an operator places one weight measuring apparatus of the present invention in front of and in contact with each wheel of the wheeled or wheel-supported load, and then steps upon each footbar to lift the load into position for weighing. The load's total weight is obtained by summing the outputs of the individual apparatuses. Though the invention also has broad application in weighing any wheeled or wheel-supported load whose weight does not exceed a human operator's ability to lever the load into position, the primary application of the present invention is in weighing non-ambulatory patients confined to wheeled beds.

BRIEF DESCRIPTION OF THE DRAWINGS

A preferred embodiment of the present invention is described in detail below with reference to the attached drawing figures, wherein:

FIG. 4 is a perspective view of the apparatus with portions broken away which illustrates the relationships of the assembled components.

FIG. 5 is a side elevational view of the apparatus in partial section which further illustrates the relationships of the assembled components.

FIG. 6 is a block diagram which illustrates the operational relationship between several load cells that are a part of a preferred embodiment of the weight-measuring apparatus of the present invention.

DETAILED DESCRIPTION OF THE PREFERRED EMBODIMENT

Figure 1:
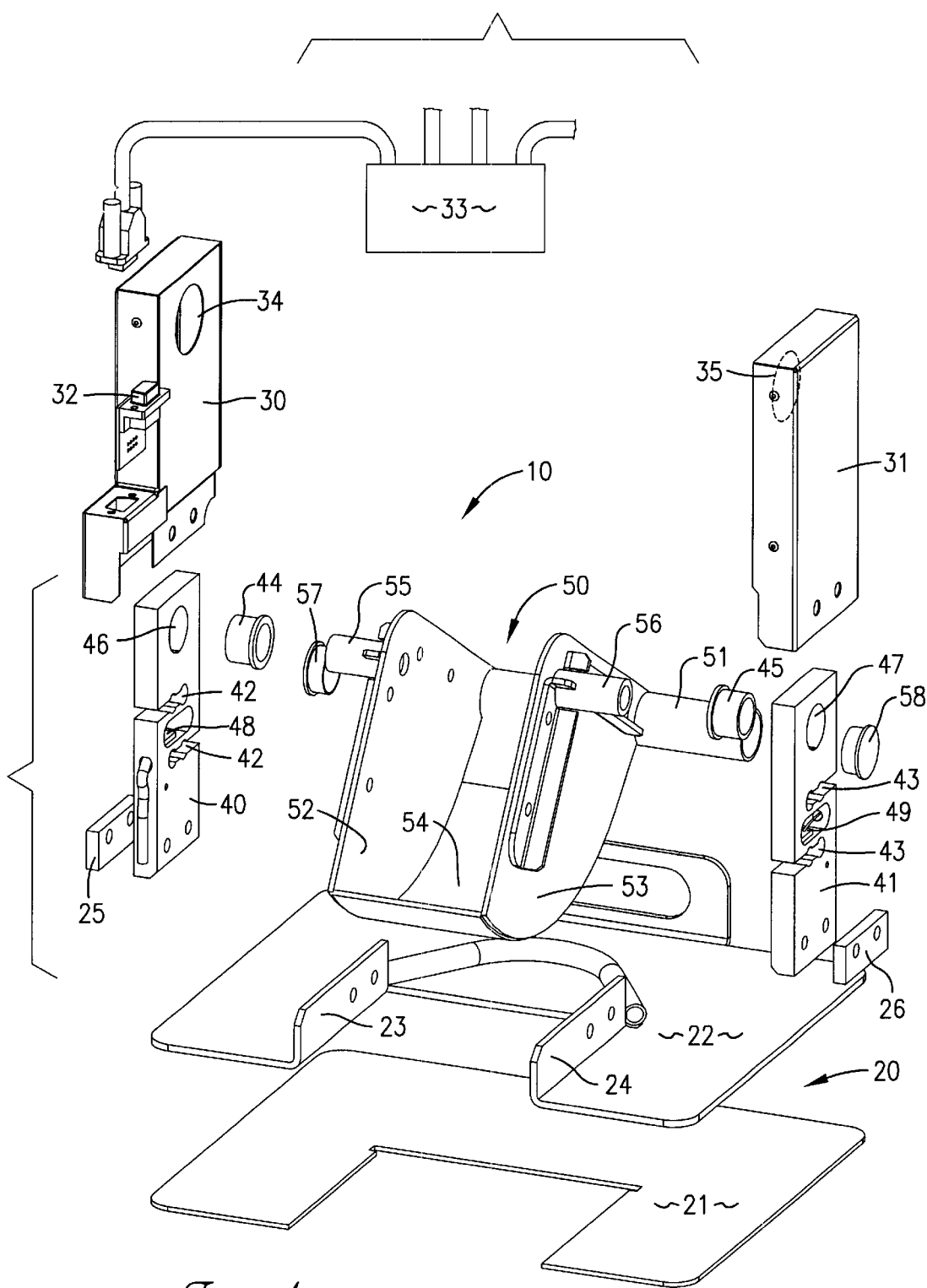
FIG. 1 is an exploded view of a preferred embodiment of the weight-measuring apparatus of the present invention illustrating the relationships between the major components.

Referring to the drawing figures, and particularly to FIG. 1, a weight-measuring apparatus 10 constructed in accordance with a preferred embodiment of the present invention is illustrated. Such an apparatus 10 can be used for measuring the weight of a wheeled or wheel-supported load. In the preferred embodiment, several of the apparatuses 10 are used to measure the weight of a non-ambulatory patient without removing the patient from his or her wheeled bed. The apparatus 10 includes four major components: a base 20; left and right protective covers 30,31; left and right weight-measuring sensors 40,41; a wheel receptacle 50; and a foot bar 51.

The base 20 supports the other components of the apparatus 10. The base 20 is comprised of a top portion 22 and a bottom portion 21, both of which are substantially flat and U-shaped. The bottom portion 21 is an anti-skid pad or floor protector, and is fixedly attached to the underside of the top portion 22. From the interior edges of the top portion 22, a left flange 23 and a right flange 24 extend perpendicularly upward from the base 20. The left and right flanges 23,24 have holes to allow for bolting the left and right protective covers 30,31, left and right weight-measuring sensors 40,41, and other components to the flanges 23,24. The bottom portion 21 of the base 20 is made of a non-skid or non-abrasive material. The top portion 22 is made of heavy gauge metal or other suitable material.

The left and right protective covers 30,31 cover and protect the left and right weight-measuring sensors 40,41. The left and right protective covers 30,31 are made of light gauge metal or other suitable material, and are substantially rectangular, hollow, and open at their respective bases in order to accommodate the left and right weight-measuring sensors 40,41. Furthermore, each protective cover 30,31 has a circular opening 34,35 near its top to allow portions of the wheel receptacle 50 to pass through unobstructed to the weight-measuring sensors 40,41 and to allow the wheel receptacle 50 to rotate freely. The left and right protective covers 30,31 are bolted to the left and right flanges 23,24, and extend perpendicularly upward from the base 20.

The left and right weight-measuring sensors 40,41 support the wheel receptacle 50 and are positioned and operable to measure a weight suspended in the wheel receptacle 50, as described below. The left and right weight-measuring sensors 40,41 are rectangularly-shaped, with intermediate cut-outs 42,43, and have circular openings 46,47 near their respective tops which correspond to similar, though larger, circular openings 34,35 in the left and right protective covers 30,31. Any type of force-sensing transducer may be used to determine the weight of the load as it is applied to the left and right weight-measuring sensors 40,41. The preferred embodiment uses strain gauges 48,49 mounted upon the left and right weight-measuring sensors 40,41 to detect the strain in the left and right weight-measuring sensors 40,41 from the force applied to them when a load is positioned in the wheel receptacle 50 (see FIG. 5). The strain in the left and right weight-measuring sensors 40,41 is converted to an electrical signal by the strain gauges 48,49 and transmitted to a weight indicator 33 via an electrical connector 32 (see FIG. 5). The left and right weight-measuring sensors 40,41 are bolted to the left and right flanges 23,24, extend perpendicularly upward from the base 20, and are housed within the left and right protective covers 30,31. A left spacer block 25 is bolted between the left protective cover 40 and the left weight-measuring sensor 30, and a right spacer block 26 is bolted between the right protective cover 41 and the right weight-measuring sensor 31, to prevent the protective covers 30,31 from directly contacting the weight-measuring sensors 40,41 and affecting the weight measurement. The left and right spacer blocks 25,26 are rectangular and made of metal or some other suitable material.

The weight indicator 33 is operable to receive the summed electrical signals produced by a plurality of weight-measuring sensors 40,41, and to output or otherwise display the result (see FIG. 6).

Figure 3:
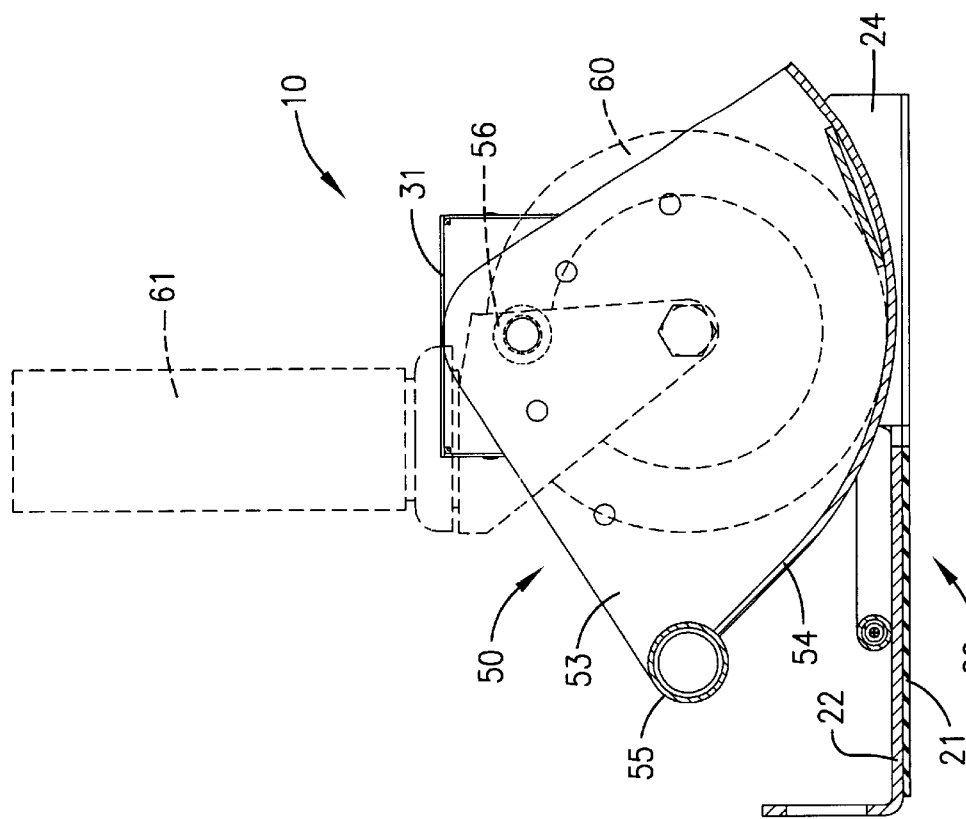
FIG. 3 is a vertical side sectional view of the apparatus which illustrates an intermediate stage of operation of the apparatus.
Figure 2:
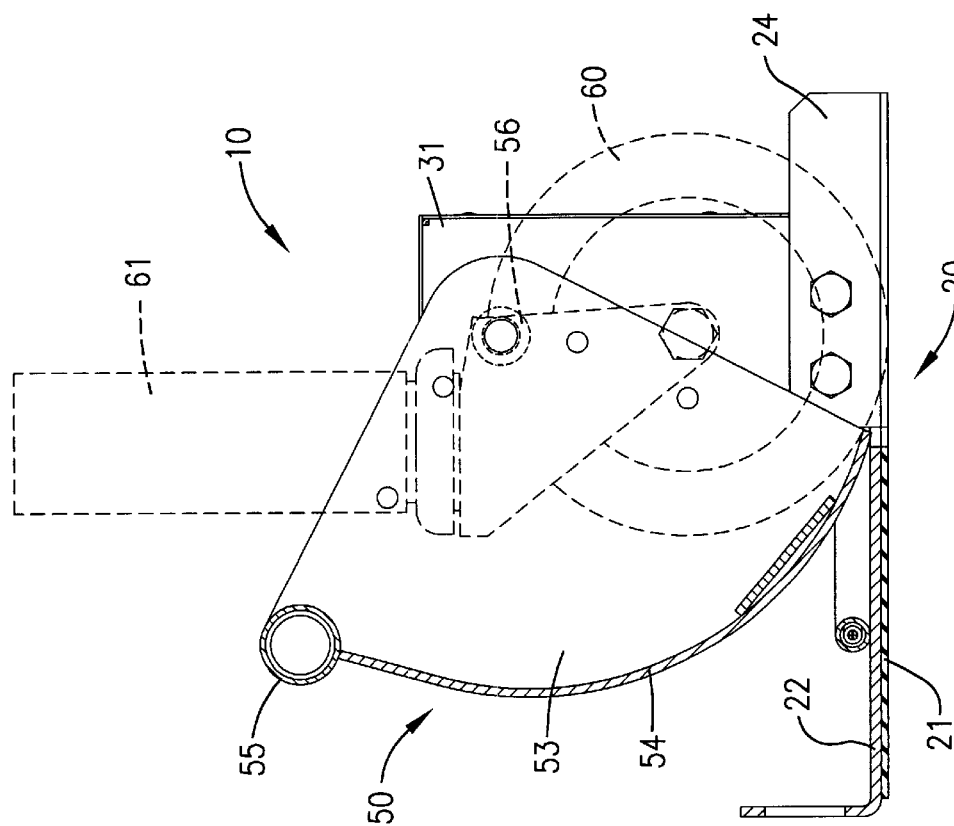
FIG. 2 is a vertical side sectional view of the apparatus which illustrates the initial stage of operation of the apparatus.

The wheel receptacle 50 is operable to receive a wheel 60 and then pivot with the wheel 60 about a horizontally-extending axis, thereby lifting the wheel 60 so that neither the wheel 60 nor the wheel receptacle 50 are in direct contact with the ground, floor, or base 20 of the apparatus 10 (see FIGS. 2 and 3). The wheel receptacle 50 comprises a left side wall 52, a right side wall 53, a bottom wall 54, a left pivot pin 55, a right pivot pin 56, and a foot bar 51. In the preferred embodiment, the left and right side walls 52,53 are semi-triangular in shape, with the base of the triangle being rounded in order to accommodate the bottom wall 54, which is preferably concave in order to more easily receive a wheel 60 or caster (see FIGS. 2 and 3).

Together, the left and right pivot pins 55,56 provide an axis around which the wheel receptacle 50 is free to rotate. The left and right pivot pins 55,56 are fixedly mounted to the left and right side walls 52,53 so that they extend perpendicularly therefrom, pass through the circular openings 34,35 of the left and right protective covers 30,31, and are rotatably received within the circular support openings 34,35 of the weight-measuring sensors 40,41. Bushings 44,45 may be used to line the circular support openings 34,35 of the weight-measuring sensors 40,41 in order to reduce wear and facilitate rotation.

The footbar 51 is attached to the left and right side walls 52,53 of the wheel receptacle 50 in such a manner and position that a force acting upon the footbar 51 will cause the wheel receptacle 50 to rotate about the axis formed by the left and right pivot pins 55,56. Protective endcaps 57,58 may cover both ends of the footbar 51. Because the footbar 51 and left and right side walls 52,53 act as a lever, with the fulcrum being the left and right pivot pins 55,56, the footbar 51 is preferably attached to the left and right side walls 52,53 as far as possible from the left and right pivot pins 55,56.

The assembled apparatus 10 is illustrated in FIG. 4. A portion of the left and right protective covers 30,31 are shown broken away in order to more clearly illustrate the relationship between the left and right weight-measuring sensors 40,41 and the left and right protective covers 30,31

Referring to FIGS. 2 and 3, in operation, an operator places one weight-measuring apparatus 10 of the present invention in front of and in contact with each wheel 60 of a wheeled or wheel-supported load, such as a hospital bed. For illustration, the wheel 60 is shown attached to the leg of a hospital bed 61. The operator then steps upon each footbar 51 to lift the load into position for weighing. FIG. 3 illustrates the weighing position, with the wheel 60 being held within the wheel receptacle 50 and suspended between the left and right weight-measuring sensors 40,41 (see also FIG. 1). The load's total weight is obtained by summing the signals from each weight measuring apparatus 10 and sending the resulting signal to the weight indicator 33, as shown in FIG. 6.

From the preceding description, it can be seen that the weight-measuring apparatus of the present invention alleviates problems encountered when weighing wheeled or wheel-supported loads. The apparatus is portable, lightweight, and can be positioned for use without moving the load to be weighed. More particularly, the apparatus of the present invention employs a foot-activated lever-based design which allows an operator possessing limited arm or upper body strength to lift, support, and weigh the load in one movement.

Although the invention has been described with reference to the preferred embodiment illustrated in the attached drawings, it is noted that equivalents may be employed and substitutions made herein without departing from the scope of the invention as recited in the claims. Furthermore, the present invention is for a positioning apparatus which is independent of and can be adjusted to a variety of weight measuring sensors.

Having thus described the preferred embodiment of the invention, what is claimed as new and desired to be protected by Letters Patent includes the following:

1. An apparatus for weighing a wheeled or wheel-supported load, the wheeled or wheel-supported load having at least one wheel, the apparatus comprising:

a base;

at least one weight-measuring arm fixedly connected to the base and extending upwardly therefrom, the weight-measuring arm being operable to determine the weight of an applied load;

a wheel receptacle rotatably suspended above the base by the weight-measuring arm, the wheel receptacle being operable to receive and hold at least one wheel of the wheeled or wheel-supported load; and a foot bar fixedly attached to the wheel receptacle for pivoting the wheel receptacle to a weighing position when stepped upon.

2. The apparatus of claim 1, further comprising at least one protective cover for protectively housing the weight-measuring arm.

3. The apparatus of claim 1, the weight-measuring arm being operable to produce an electrical signal corresponding to the weight of the applied load.

4. The apparatus of claim 1, the apparatus further comprising at least one electrical connector.

5. The apparatus of claim 1, the apparatus further comprising a display unit, the display unit being operable to convert the electrical signal output by the weight-measuring arm into a corresponding weight value and to display that value.

6. The apparatus of claim 1, the apparatus further comprising a display unit, the display unit being operable to receive and sum the electrical signals output by the weight-measuring arms of at least two of the apparatuses, and further operable to convert the resulting sum to a corresponding weight value and to display that corresponding weight value.

7. The apparatus of claim 1, the wheel receptacle having a concave bottom, a first side, and a second side, the first side being rotatably attached to one weight-measuring arm by a first pivot pin, the second side being rotatably attached to a second weight-measuring arm by a second pivot pin, the wheel receptacle being operable to receive a wheel and to pivot about an axis formed by the first pivot pin and the second pivot pin.

8. An apparatus for weighing a wheeled or wheel-supported load, the wheeled or wheel-supported load having at least one wheel, the apparatus comprising:

a base having an upper portion and a lower portion, the lower portion being made of a slip resistant material;

a first weight-supporting arm and a second weight-supporting arm, the first weight-supporting arm being removably attached to the base and operable to rotatably receive a first pivot pin, the second weight-supporting arm being removably attached to the base and operable to rotatably receive a second pivot pin;

a first force-measuring transducer and a second force-measuring transducer, the first force-measuring transducer being mounted upon or within the first weight-supporting arm and operable to determine the weight of a load applied to the first weight-supporting arm, the second force-measuring transducer being mounted upon or within the second weight-supporting arm and operable to determine the weight of a load applied to the second force-supporting arm;

a wheel receptacle having a concave bottom, a first side, and a second side, the first side being rotatably coupled to the first weight-measuring support by the first pivot pin, the second side being rotatably coupled to the second weight-measuring support by the second pivot pin, the wheel receptacle being operable to receive a wheel and to pivot about an axis formed by the first pivot pin and the second pivot pin; and a foot bar fixedly attached to the wheel receptacle for pivoting the wheel receptacle to a weighing position when stepped upon.

9. The apparatus of claim 8, the first and second force-measuring transducers being electrical in nature.

10. The apparatus of claim 8, the first and second force-measuring transducers being strain gauges.

11. The apparatus of claim 8, the apparatus further comprising at least one electrical connector.

12. The apparatus of claim 8, the apparatus further comprising a display unit, the display unit being operable to convert the electrical signal output by the first and second force-measuring transducers into a corresponding weight value and to display that value.

13. The apparatus of claim 8, the apparatus further comprising a display unit, the display unit being operable to receive and sum the electrical signals output by the force-measuring transducers of at least two of the apparatuses, and further operable to convert the resulting sum to a corresponding weight value and to display that corresponding weight value.

\* \* \* \* \*